(12) United States Patent
Smith et al.

(10) Patent No.: US 9,638,882 B2
(45) Date of Patent: May 2, 2017

(54) SPOOLING CABLE

(71) Applicant: Google Inc., Mountain View, CA (US)

(72) Inventors: Christopher Lee Smith, Palo Alto, CA (US); Sandeep Lalgudi Jayaram, San Francisco, CA (US); John Paul Hill, Andover, MN (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/235,193

(22) Filed: Aug. 12, 2016

(65) Prior Publication Data
US 2016/0349473 A1 Dec. 1, 2016

Related U.S. Application Data

(62) Division of application No. 14/136,247, filed on Dec. 20, 2013, now Pat. No. 9,459,425.

(51) Int. Cl.
| | |
|---|---|
| *G02B 6/44* | (2006.01) |
| *G02B 6/38* | (2006.01) |
| *B65H 49/32* | (2006.01) |
| *B65H 75/44* | (2006.01) |
| *G02B 6/46* | (2006.01) |
| *G02B 6/35* | (2006.01) |

(52) U.S. Cl.
CPC ......... *G02B 6/4457* (2013.01); *B65H 49/325* (2013.01); *B65H 49/327* (2013.01); *B65H 49/328* (2013.01); *B65H 75/4428* (2013.01); *G02B 6/3897* (2013.01); *G02B 6/4466* (2013.01); *G02B 6/46* (2013.01); *B65H 2701/32* (2013.01); *G02B 6/3564* (2013.01); *G02B 6/4454* (2013.01); *Y10T 29/49826* (2015.01)

(58) Field of Classification Search
CPC ............................ G02B 6/3564; G02B 6/4457
See application file for complete search history.

(56) References Cited

U.S. PATENT DOCUMENTS

| 4,248,034 A | 2/1981 | Jackson et al. | |
|---|---|---|---|
| 5,060,882 A | 10/1991 | Rousculp et al. | |
| 5,228,631 A * | 7/1993 | Hu .......................... | B65H 54/10 242/159 |
| 6,398,149 B1 * | 6/2002 | Hines ..................... | A47B 21/06 242/388.6 |
| 6,751,883 B2 | 6/2004 | Liao | |
| 6,994,289 B2 | 2/2006 | Liao | |

(Continued)

FOREIGN PATENT DOCUMENTS

| EP | 451734 A1 | 10/1991 |
|---|---|---|
| GB | 723703 A | 2/1955 |
| GB | 2243822 A | 11/1991 |

*Primary Examiner* — Thomas A Hollweg
*Assistant Examiner* — Mary A El Shammaa
(74) *Attorney, Agent, or Firm* — Honigman Miller Schwartz and Cohn LLP

(57) ABSTRACT

A method includes mounting a spool system at a floor level of a multiple dwelling unit. The floor level has multiple customer units. The spool system includes at least one spool of fiber optic cable. Each end of each fiber optic cable has a spliced-on connector. The method further includes paying out a length of fiber optic cable from the at least one spool to reach a customer unit of the floor level, connecting one of the connectors of the paid-out fiber optic cable to a floor splitter, and connecting the floor splitter to a distribution splitter of the multiple dwelling unit.

13 Claims, 16 Drawing Sheets

(56) References Cited

U.S. PATENT DOCUMENTS

| | | | | |
|---|---|---|---|---|
| 7,627,223 B1* | 12/2009 | Burek | ............ | G02B 6/4457 |
| | | | | 385/134 |
| 2004/0098876 A1 | 5/2004 | Liao | | |
| 2004/0140386 A1 | 7/2004 | Liao | | |
| 2005/0253011 A1 | 11/2005 | Liao | | |
| 2008/0315030 A1* | 12/2008 | Hendrickson | ........ | B65H 49/327 |
| | | | | 242/565 |
| 2009/0294388 A1* | 12/2009 | Leichter | ............ | G02B 6/4457 |
| | | | | 211/85.5 |
| 2011/0103761 A1* | 5/2011 | LeBlanc | ............ | G02B 6/4441 |
| | | | | 385/135 |
| 2012/0063735 A1* | 3/2012 | Nair | ............ | G02B 6/4446 |
| | | | | 385/135 |
| 2013/0284844 A1* | 10/2013 | Holmberg | ............ | B65H 75/38 |
| | | | | 242/407 |

* cited by examiner

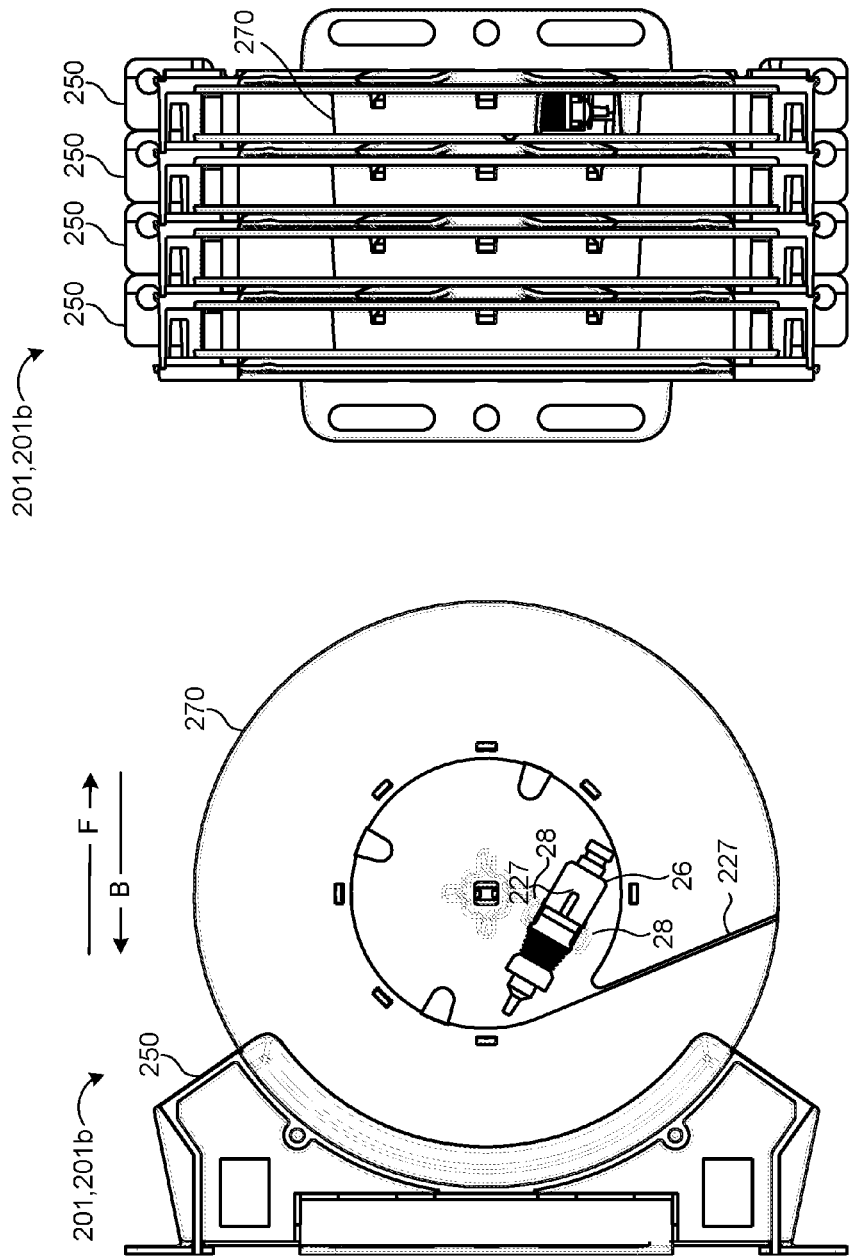

SPOOLING CABLE

CROSS REFERENCE TO RELATED APPLICATIONS

This U.S. patent application is a divisional of, and claims priority under 35 U.S.C. §121 from, U.S. patent application Ser. No. 14/136,247, filed on Dec. 20, 2013, which is hereby incorporated by reference in its entirety.

TECHNICAL FIELD

This disclosure relates to spooling cable.

BACKGROUND

Billions of dollars are spent annually delivering high speed fiber networks to Multi-Dwelling Units (MDUs), such as apartments, condos, and student-housing. Service providers recognize the rich potential returns on a fiber investment in such high-density markets. There are a number of fiber network architectures that service providers use for deployment of fiber-to-the-premise (FTTP) services. A Passive Optical Network (PON) has been very successful in this application.

PON technology is a point-to-multipoint FTTP network architecture that uses unpowered optical splitters, which allow a single optical fiber to serve multiple premises. Being passive, a PON has no active electronics in the network loop, which significantly lowers maintenance costs. Also, due to the reduced number of network elements there are fewer potential failure points, minimizing operational expense.

In MDU environments, there is typically limited space in equipment rooms on each floor to store telecom cross-connect cabinets, let alone slack storage. Due to the size of drop fiber cable, a fiber installation usually requires an additional slack storage box to store drop fiber slack. Since there is typically little or no space at all in each equipment closet, installers currently cut the fiber to length and splice on connectors to minimize slack storage.

SUMMARY

In MDU environments, an installer may install a fiber optic cable in a hallway, between a riser and a customer unit space. A cable fiber manufacturer determines the lengths of the cables. Therefore, an installer either stores the unused cable or cuts the fiber to a desired length. Field splicing fiber typically increases overall labor time and cost. Moreover, field fusion splicing typically occurs in non-ideal environments. Splicing the fiber and installing the connectors in a controlled environment, such as a factory, reduces potential craftsmanship errors that can arise from many different field technicians splicing, bad field conditions for splicing, and errors in testing splices. A drop wheel having a spool of fiber with plug & play connectors on each end of the fiber eliminates the time to field splice on each connector to the fiber as well as the labor unit to do so. The drop wheel technology eliminates the space concerns by using small fiber drop cable in a very small space.

One aspect of the disclosure provides a spool system that includes a spool and a spool support supporting the spool. The spool includes a spool body having a center axis of rotation, a shaft having a first end disposed on the spool body and extending from the spool body along the center axis of rotation to a second end, and an anti-rotation feature disposed on the shaft. The anti-rotation feature defines a non-circular shape.

The spool support defines a slot sized to slidably receive the shaft and a feature receiver having a complementary shape of the anti-rotation feature. The spool moves along the slot between a stowed position and a deployed position. In some examples, the spool may be detached from the spool support. The feature receiver receives the anti-rotation feature of the spool while in the stowed position, preventing rotation of the spool. The anti-rotation feature of the spool is unseated from the feature receiver while in the deployed position, allowing rotation of the spool.

Implementations of the disclosure may include one or more of the following features. In some implementations, the anti-rotation feature is disposed on the second end of the shaft. Moreover, the anti-rotation feature may define a square shape. Other shapes are possible as well, such as rectangular, triangular, oval, star, polyhedral, etc. The slot has first and second ends, and one end of the slot may define the feature receiver.

In some implementations, the spool support includes a base and a cantilevered arm disposed on the base. The cantilevered arm defines the slot and the feature receiver. The base may define a spool seat that receives the spool (e.g., seated in the spool seat) while in the stowed position. The spool support may include a spool splitter disposed on the base.

In some implementations, the spool body includes a flanged cylinder defining a bore and a shaft support disposed in the bore. The shaft support receives the shaft, such that rotation of the shaft causes rotation of the flanged cylinder. Alternatively, the spool body may include first and second ringed discs spaced parallel from each other and a spool core disposed between the ringed discs. The spool core receives the shaft, such that rotation of the shaft causes rotation of the spool core. One of the ringed discs may define a slit extending from an inner diameter of the ringed disc to an outer diameter of the ringed disc.

Another aspect of the disclosure provides a method of using a spool. The spool includes a spool body having a center axis of rotation and a shaft that has a first end disposed on the spool body and extending from the spool body along the center axis of rotation to a second end. Moreover, the spool includes an anti-rotation feature disposed on the shaft. The anti-rotation feature defines a non-circular shape. The spool moves between a stowed position and a deployed position along a slot defined by a spool support. The anti-rotation feature of the spool is unseated from a feature receiver defined by the spool support while in the deployed position, allowing rotation of the spool. The method includes moving the spool from the stowed position to the deployed position on the spool support that supports the spool. The method includes paying out a length of cable spooled on the spool and moving the spool from the deployed position to the stowed position. The anti-rotation feature of the spool is received by the feature receiver while in the stowed position. The feature receiver has a complementary shape of the anti-rotation feature preventing rotation of the spool. In some examples, the method includes moving the spool onto a spool seat defined by the spool support when the spool is the stowed position. The method may include connecting a connector disposed on one end of the cable to a spool splitter disposed on the spool support.

In some implementations, the spool support includes a base and a cantilevered arm disposed on the base. The cantilevered arm defines the slot and the feature receiver.

The anti-rotation feature may be disposed on the second end of the shaft and may define a square shape. Additionally or alternatively, the slot may have first and second ends, where one end of the slot defines the feature receiver.

The spool body may include a flanged cylinder defining a bore and a shaft support disposed in the bore and receiving the shaft. A rotation of the shaft causes rotation of the flanged cylinder. In some examples, the spool body includes first and second ringed discs spaced parallel from each other and a spool core disposed between the ringed discs and receiving the shaft. The rotation of the shaft causes rotation of the spool core. One of the ringed discs may define a slit extending from an inner diameter of the ringed disc to an outer diameter of the ringed disc.

Another aspect of the disclosure provides a method that includes mounting a spool system at a floor of a multiple dwelling unit. The floor has multiple customer units, and the spool system includes at least one spool of fiber optic cable. Each end of each fiber optic cable has a spliced on connector. The method further includes paying out a length of fiber optic cable from the at least one spool to reach a customer unit of the multiple dwelling unit, connecting one of the connectors of the paid out fiber optic cable to a floor splitter, and connecting the floor spool splitter to a distribution splitter of the multiple dwelling unit.

In some implementations, the distribution splitter of the multiple dwelling unit is connected to other floor splitters associated with other floors of the multiple dwelling unit. The method may include moving the spool from a stowed position to a deployed position on a spool support supporting the spool before paying out the length of fiber optic cable spooled on the spool. The spool includes a spool body having a center axis of rotation, a shaft having a first end disposed on the spool body and extending from the spool body along the center axis of rotation to a second end, and an anti-rotation feature disposed on the shaft. The anti-rotation feature defines a non-circular shape. The spool moves between the stowed position and the deployed position along a slot defined by a spool support. The anti-rotation feature of the spool is unseated from a feature receiver defined by the spool support while in the deployed position, allowing rotation of the spool. The method also includes moving the spool from the deployed position to the stowed position after paying out the length of fiber optic cable. The feature receiver receives the anti-rotation feature of the spool while in the stowed position. The feature receiver has a complementary shape of the anti-rotation feature preventing rotation of the spool.

The method may include moving the spool onto a spool seat defined by the spool support when the spool is the stowed position. The spool support may include a base and a cantilevered arm disposed on the base. The cantilevered arm defines the slot and the feature receiver. The slot has first and second ends; one end of the slot defines the feature receiver.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 8B is a side view of the exemplary array of the spooling systems of FIG. 8A.

FIG. 8C is a front view of the exemplary array of the spooling systems of FIG. 8A.

Like reference symbols in the various drawings indicate like elements.

DETAILED DESCRIPTION

Figure 1:
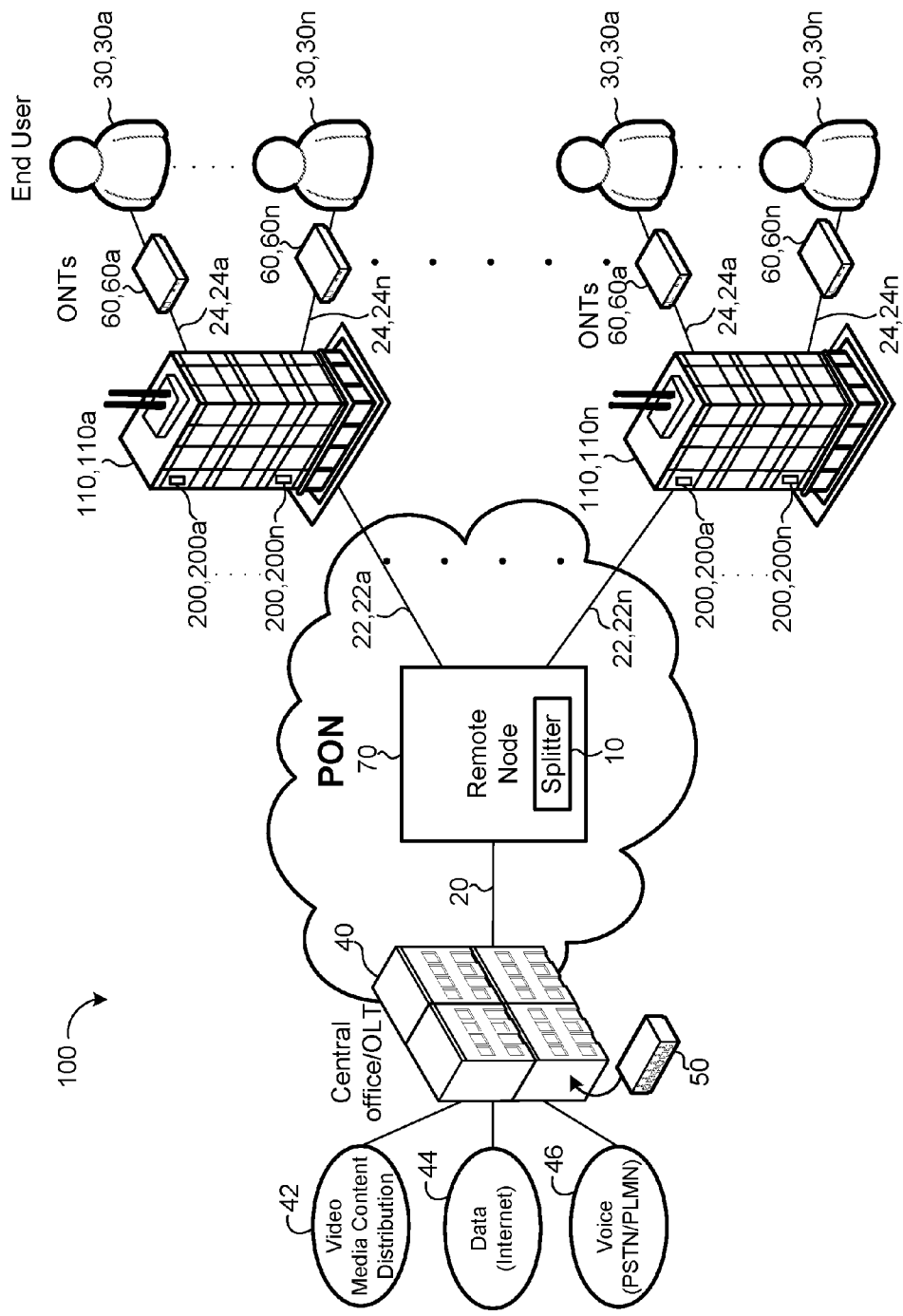
FIG. 1 is a schematic view of an optical network using an exemplary spooling system.

Fiber-to-the-home (FTTH) is the delivery of a communication signal through optical fibers from a central office (CO) or optical line terminal (OLT) to a home or a business of a user. Referring to FIG. 1, a passive optical network (PON) 100 is a point-to-multipoint network architecture that uses optical splitters 10 to enable a single optical fiber feeder 20 to serve multiple users 30a-30n (e.g. 16-128). The PON 100 may be a Wave Division Multiplexing PON (WM-PON) or a Gigabit-capable PON (GPON). The PON 100 provides optical signals from the CO 40 and includes an optical line terminal 50 (e.g., optical transmitter/receiver or transceiver) to a number of optical network units/terminals (ONUs or ONTs) 60. Each ONU 60 includes an optical transmitter/receiver (i.e., transceiver) for transmitting and receiving data from the CO 40. In some examples, the PON 100 includes multiple optical transmitter/receiver or transceiver systems 50. One feeder fiber 20 is sent from the CO 40 to a remote node 70, where the signal is split and distributed to many (e.g., 16, 205 or more) different MDUs 110, 110a-10On via fiber feeders 22, 22a-22n. Each MDU 110 splits the signal received by the fiber feeder 22 and distributes the signal to many ONTs 60a-60n via fiber feeders 24, 24a-24n to multiple users 30a-30n. An ONT 60 describes a single tenant ONU 60. In addition, an ONT 60 is located at the customer premise, while the ONT 60 is located outside the premises.

Therefore, the ONT 60 is used when the fiber extends into the premises or home of a customer, while the ONU 60 is used when the fiber is terminated outside the home.

The CO 40 receives information, such as video media distribution 42, internet data 44, and voice data 46 that may be transferred to the end users 30. The CO 40 includes an OLT 50 connecting the optical access network to an IP, ATM, or SONET backbone, for example. Therefore, the OLT 50 is the endpoint of the PON 100 and converts the electrical signals used by a service provider's equipment and the fiber optic signals used by the PON 100. In addition, the OLT 50 coordinates multiplexing between the conversion devices at the user end. The OLT 50 sends the fiber optic signal through a feeder fiber 20, and the signal is received by a remote node 70, which demultiplexes the signal and distributes it to multiple users 30.

Figure 2:
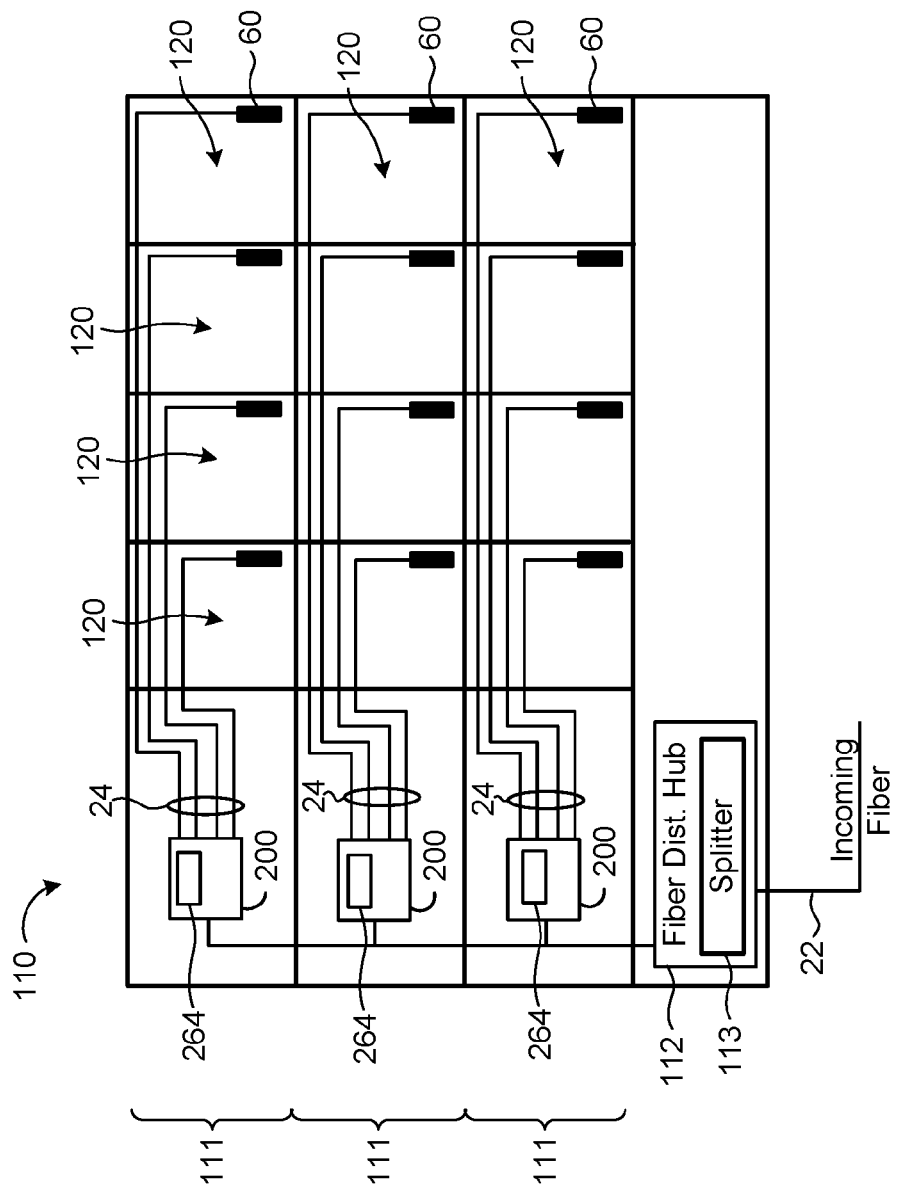
FIG. 2 is a schematic view of an MDU using an exemplary spooling system.

Referring to FIG. 2, in MDU 110 environments, such as apartments, condos, and student-housing, an installer may install a custom length of fiber optic cable 24 in a hallway, between a riser and a customer unit space 120. Field splicing fiber typically increases overall labor time and cost. Moreover, field fusion splicing typically occurs in non-ideal environments. Splicing the fiber and installing the connectors in a controlled environment, such as a factory, reduces potential craftsmanship errors that can arise from many different field technicians splicing, bad field conditions for splicing, and errors in testing splices. A spool system 200 having a spool of fiber with plug & play connectors on each end of the fiber eliminates the time to field splice on each connector to the fiber as well as the labor unit to do so. In addition, the spool system 200 includes small fiber drop cable, which reduces the space needed to fit extra unused fiber cable 24.

FIG. 2 shows a method of deploying fiber into an MDU 110. The fiber cable 22 reaches the MDU 110 via the fiber feeder 22 and is distributed to each floor 111 of the MDU 110 via a fiber distribution hub 112. The fiber distribution hub 112 includes a splitter 113 for splitting the incoming signal 22 to each floor. Each floor 111 includes multiple units 120. The spool system 200 may be installed on each floor and an installer can deploy a fiber cable 24 from the spool system 200 (that is split from the incoming fiber 22 using a spool splitter 264 discussed below) to each user's unit 120. Therefore, each user 30 receives a direct fiber connection 24. As described one splitter 113 is used at the fiber distribution hub 113, and another spool splitter 264 is used at the spool system 100; however one of the splitter 113 or the spool splitter 264 may be used alone. An ONT 60 is located at the user's unit 120 or outside the user's unit 120 to convert the fiber signal to electrical signal.

Referring to FIGS. 3A-6B, in some implementations, the spool system 200 includes a spool 210 and a spool support 250 supporting the spool 210. The spool 210 includes a spool body 220 having a center axis of rotation R, a shaft 230 having a first end 230a disposed on the spool body 220 and extending from the spool body 220 along the center axis of rotation R to a second end 230b, and an anti-rotation feature 240 disposed on the shaft 230. The anti-rotation feature 240 defines a non-circular shape. In the examples shown, the anti-rotation feature 240 defines a square shape; however, other shapes that limit rotation are possible as well, such as a rectangle, triangle, oval, star, polyhedron, etc.

Figure 3A:
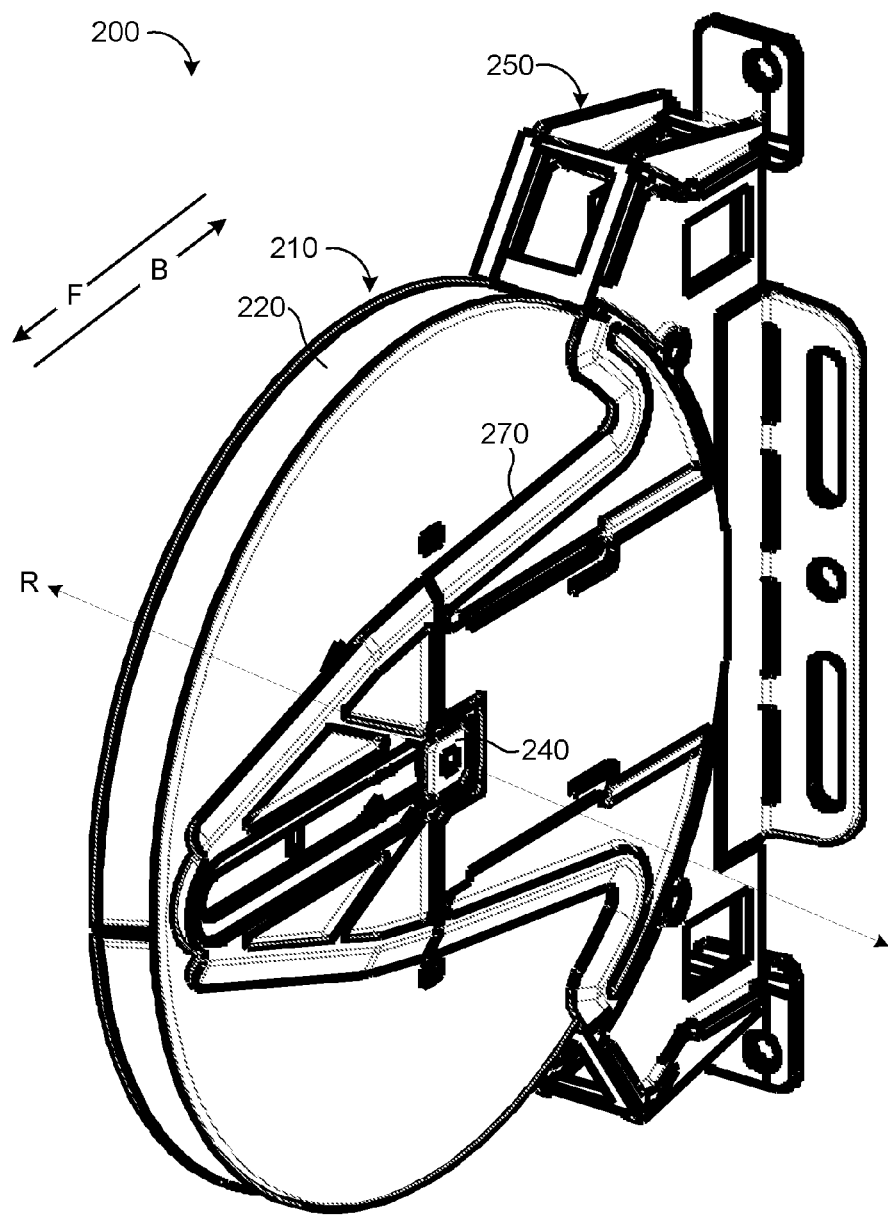
FIG. 3A is a perspective view of an exemplary spooling system in a stowed position.
Figure 3B:
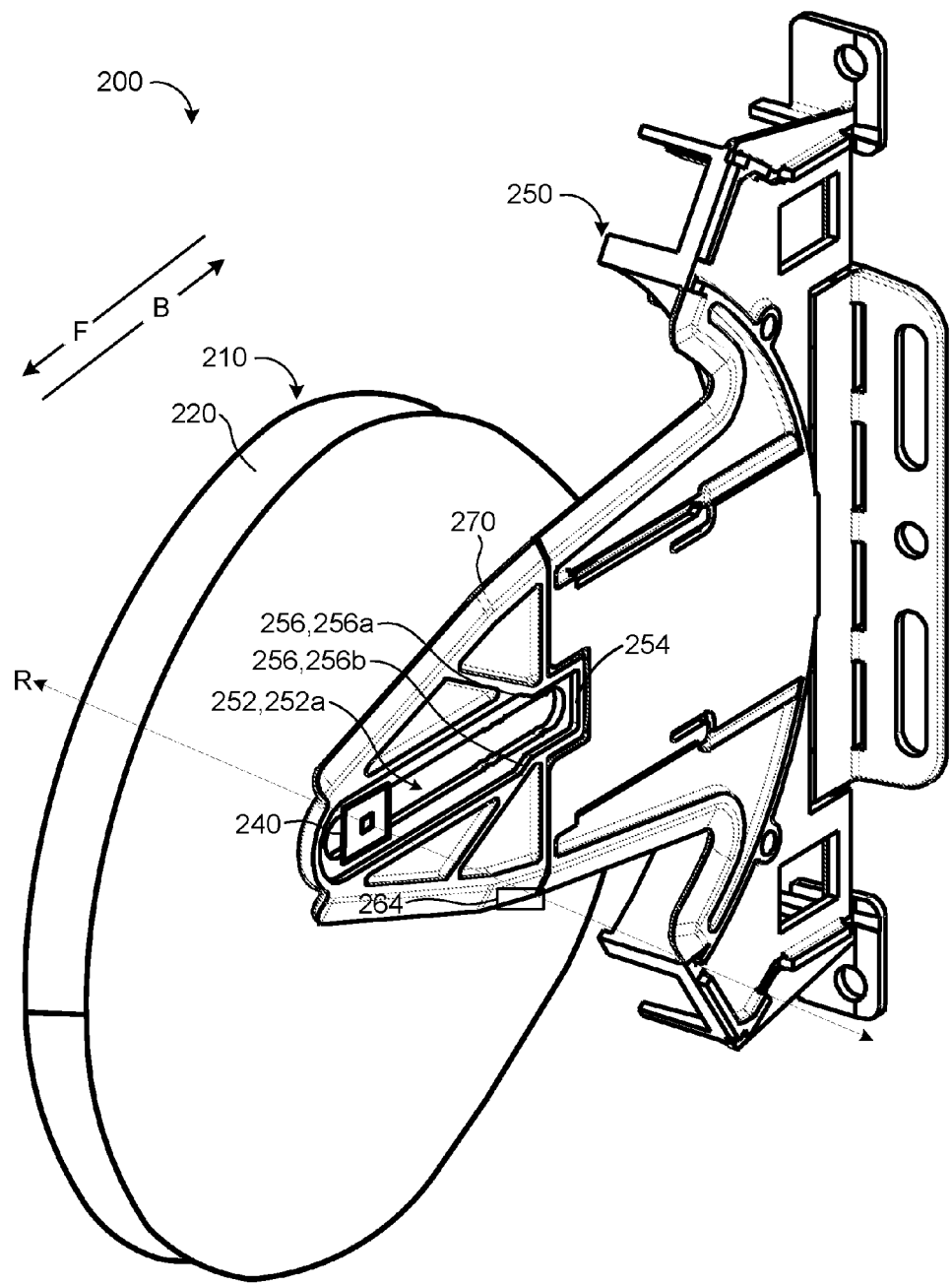
FIG. 3B is a perspective view of an exemplary spooling system in a deployed position.
Figure 3C:
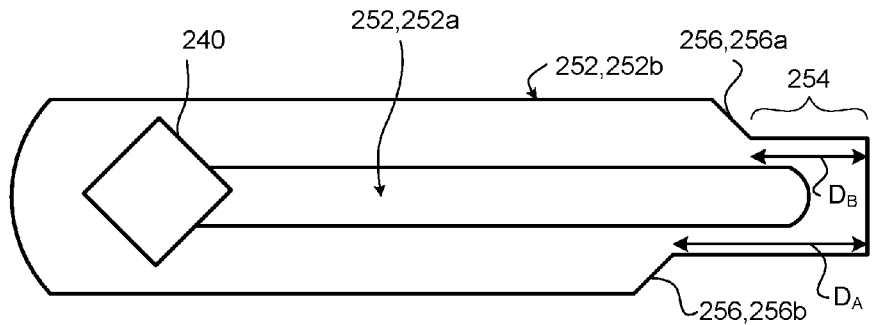
FIG. 3C is a perspective view of an exemplary spooling system in a deployed position.
Figure 3D:
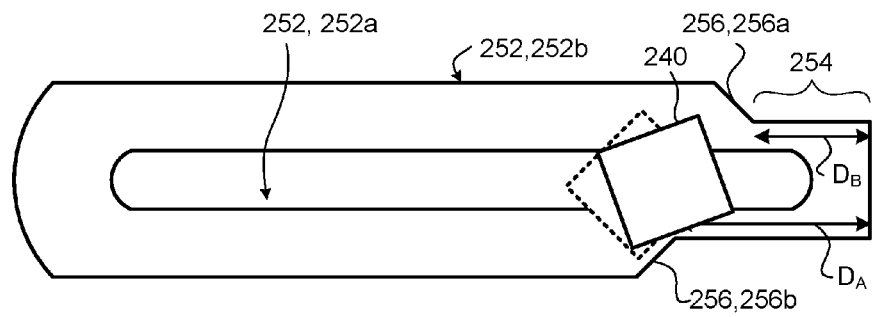
FIG. 3D is a perspective view of an exemplary spooling system transitioning from a deployed position to a stowed position.

The spool support 250 defines a slot 252 sized to slidably receive the shaft 230 and a feature receiver 254 having a complementary shape of the anti-rotation feature 240. In some examples, the spool support 250 houses MPO, SC/APC, SC/UPC, LC/APC, or LC/UPC connectors for the interface between the fiber distribution hub 112 and the spool 210. The spool 210 moves along the slot 252 between a stowed position (FIGS. 3A and 3E) and a deployed position (FIGS. 3B and 3C). In some examples, the spool 210 is releasably connected to the spool support 250 and may be detached from the spool support 250. The feature receiver 254 receives the anti-rotation feature 240 of the spool 210 while in the stowed position (FIGS. 3A and 3E), preventing rotation of the spool 210. The anti-rotation feature 240 of the spool 210 is unseated from the feature receiver 254 while in the deployed position, allowing rotation of the spool 210 due to the rotation of the shaft 230 as shown in FIG. 3C. In some examples, the slot 252 includes at least one feature guide 256 that guides the anti-rotation feature 240 towards the feature receiver 254 allowing the spool 210 to be in the stowed position. The slot 252 may include a first feature guide 256a at a first distance $D_A$ from one end of the slot 252 and a second feature guide 256b at a second distance $D_B$ from the one end of the slot 252. The first distance $D_A$ is different than the second distance $D_B$. The unequal distances of the feature guides 256 allows the guidance and rotation of the anti-rotation feature 240 to allow it to fit in its feature receiver 254 (see FIG. 3D).

In some implementations, the anti-rotation feature 240 is disposed on the second end 230b of the shaft 230 and a rotation feature 232 is disposed on the first end 230a of the shaft 230. The rotation feature 232 allows the shaft 230 to interlock with a shaft support 226 (discussed later) that has a complimentary shape to the rotation feature 232. The interlocking of the rotation feature 232 and the shaft support 226 allows the rotation of both the rotation feature 232 and the shaft support 226 when the spool system 200 is in the deployed position and an installer is removing the fiber cable 24 from the spool system 200.

The slot 252 has a first end 252a and a second end 252b, and one end of the slot 252 may define the feature receiver 254. As shown in the figures, the first end 230a defines the feature receiver 254 and the second end 230b of the shaft includes the anti-rotation feature 254 while the shaft support is on the first end 230a end of the shaft 230. However, the second end 252b of the slot may include the feature receiver 254; therefore, the shaft 230 may be received in an opposite direction in the slot 230. Alternatively, the anti-rotation feature 240 can be disposed on the shaft 230 between its first and second ends, and the feature receiver 254 can be disposed on the base 260 or some portion of the spool support 250.

Figure 3E:
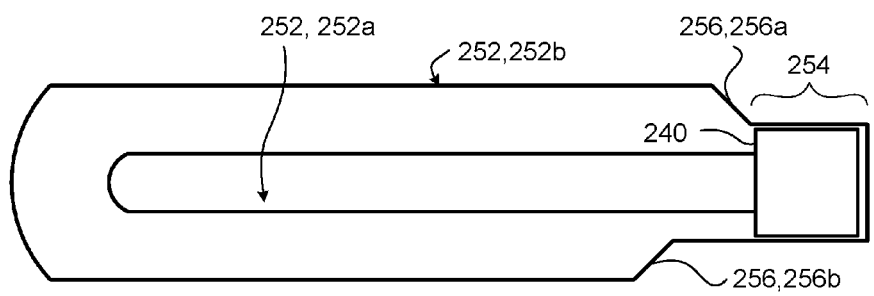
FIG. 3E is a perspective view of an exemplary spooling system in a stowed position.
Figure 4B:
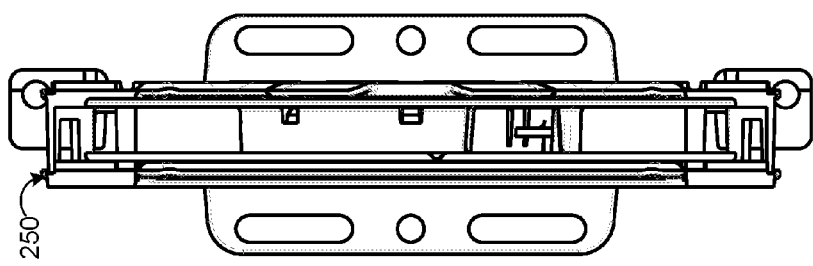
FIG. 4B is a front view of the exemplary spooling system of FIG. 4A.
Figure 4A:
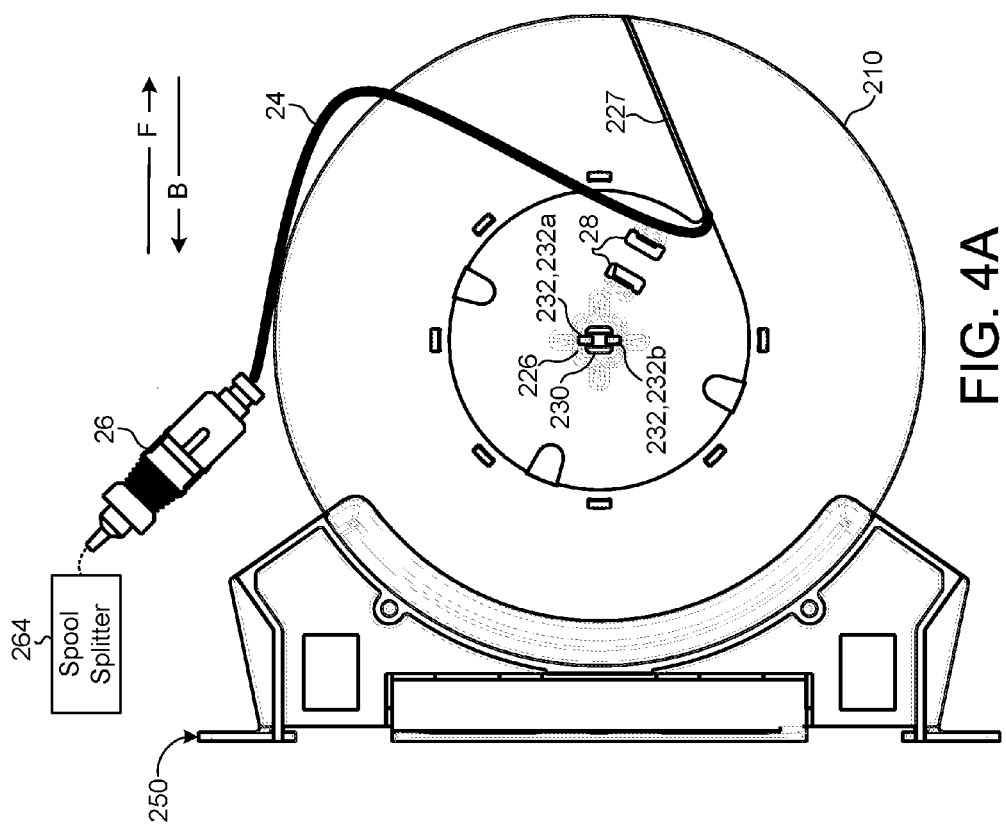
FIG. 4A is a side view of an exemplary spooling system in a stowed position.
Figure 5:
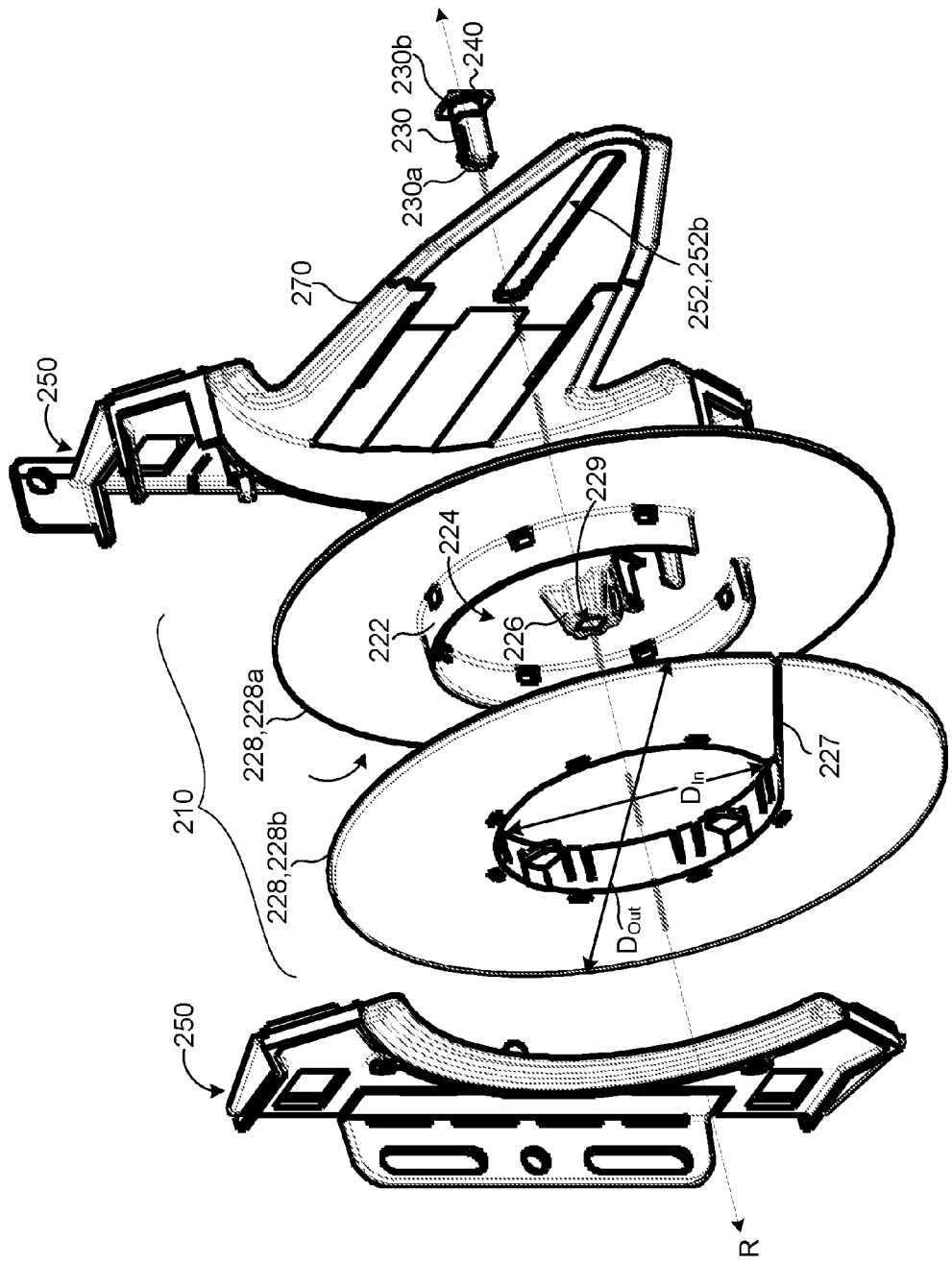
FIG. 5 is an exploded view of an exemplary spooling system.
Figure 6A:
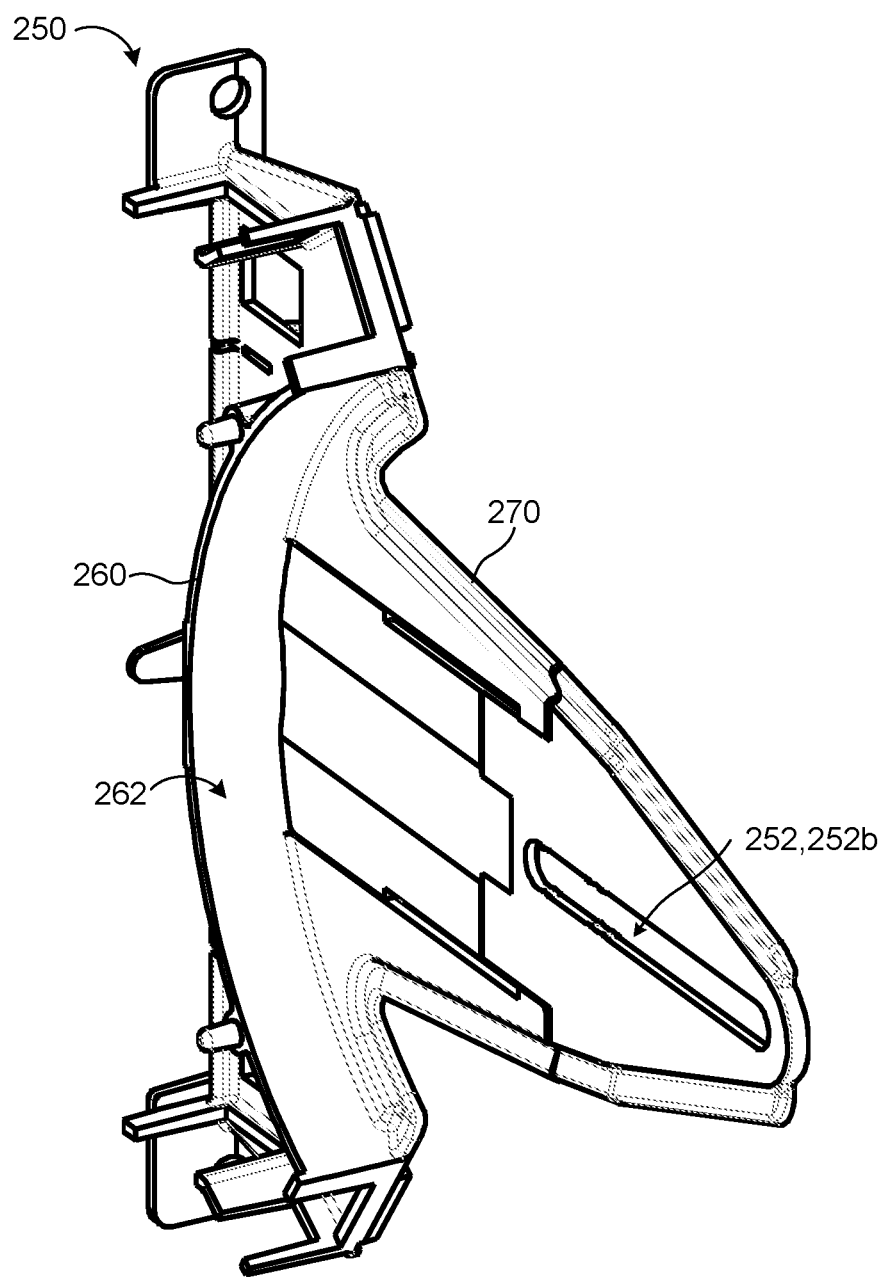
FIG. 6A is a perspective view of an exemplary spool support.
Figure 6B:
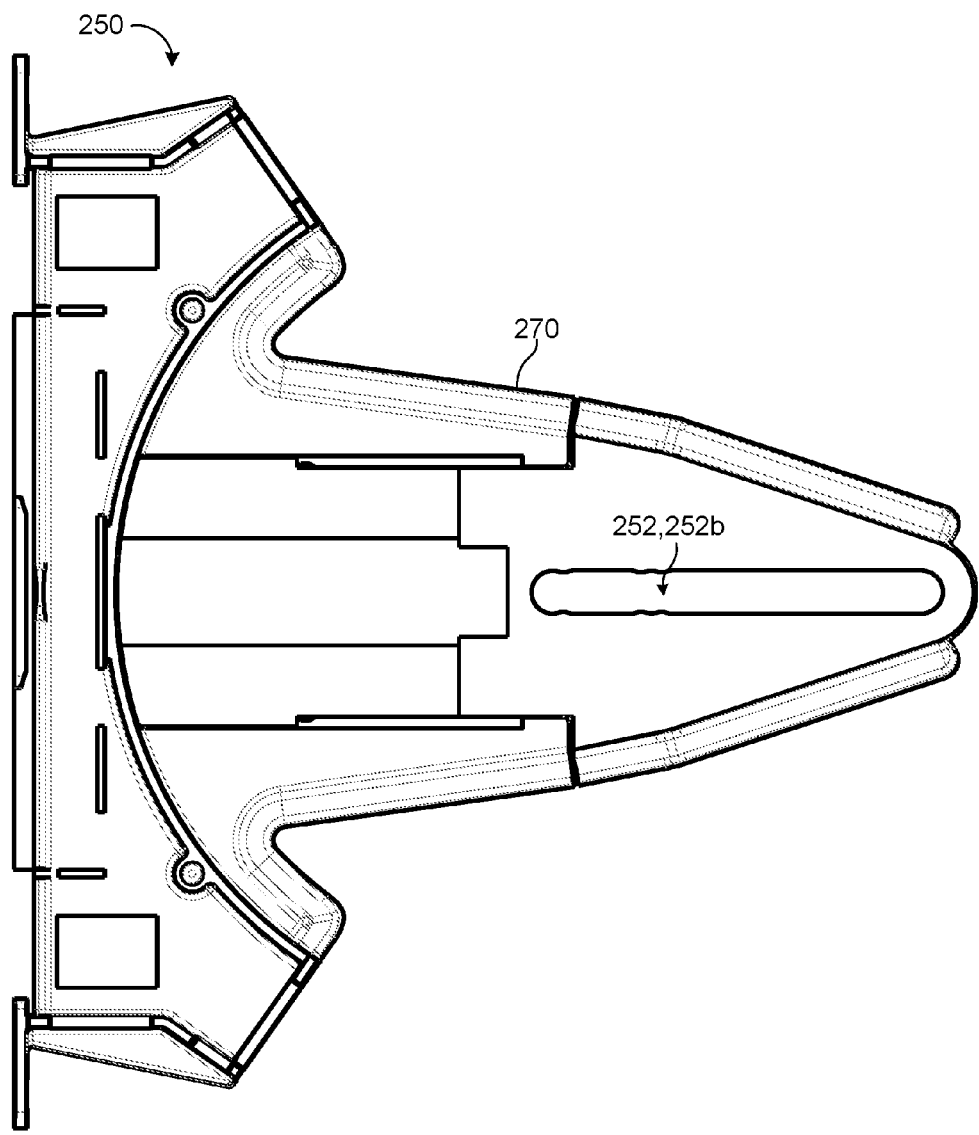
FIG. 6B is a side view of the exemplary spool support of FIG. 6A.

In some implementations, the spool support 250 includes a base 260 and a cantilevered arm 270 disposed on the base 260. The cantilevered arm 270 defines the slot 252 and the feature receiver 254. The base 260 may define a spool seat 262 that receives the spool 210 (e.g., seated in the spool seat 262) while in the stowed position (FIG. 3A and 3E). The spool seat 262 may have a shape complimentary to the shape of the spool 210.

In the examples shown, the spool 210 moves away from the spool seat 262 in a forward direction F to move to its deployed position. The spool 210 moves towards the spool seat 262 in a backward direction B to move to its stowed position. However, these directions may be opposite; for example, the feature receiver 254 may be located on a distal portion, rather than a proximal portion. In this case (not shown), the spool 210 moves away from the spool seat 262 in the backward direction B to move to its deployed position. In addition, the spool 210 moves towards the spool seat 262 in a forward direction to move to its stowed position.

Referring back to FIGS. 2 and 4A, in some examples, the spool system 200 includes a spool splitter 264 (e.g., multiplexer). The spool splitter 264 provides a one-to-many signal multiplier for delivering a signal via the fiber cables 24 to multiple users 30 (as will be later discussed with respect to FIGS. 7A-8C). The spool splitter 264 may be disposed adjacent the spool body 250.

In some implementations, the spool body 220 includes a flanged cylinder 222 defining a bore 224 and a shaft support 226 disposed in the bore 224. The shaft support 226 receives the shaft 230, such that rotation of the shaft 230 causes rotation of the flanged cylinder 222. Alternatively, the spool body 220 may include first and second ringed discs 228a, 228b spaced parallel from each other and a spool core 229 disposed between the ringed discs 228a, 228b. The spool core 229 receives the shaft 230, such that rotation of the shaft 230 causes rotation of the spool core 229. One of the ringed discs 228 may define a slit 227 extending from an inner diameter $D_{In}$ of the ringed disc 228 to an outer diameter $D_{Out}$ of the ringed disc 228. A length of fiber optic cable 24 spooled on the spool 210 may have one end portion position in the slit 227, allowing access to the end portion of the fiber optic cable 24 in the spool core 229, e.g., for connection to the spool splitter 264.

Figure 7A:
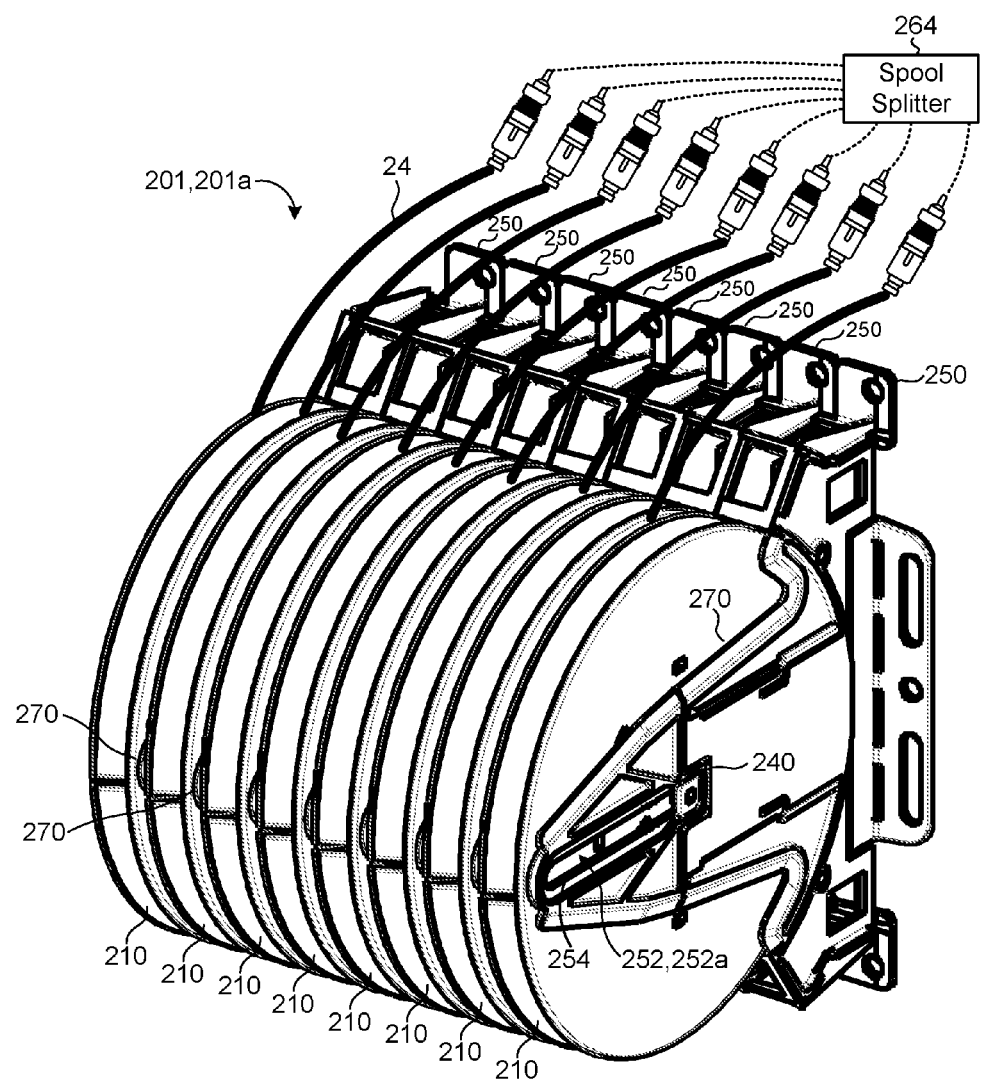
FIG. 7A is a perspective view of an exemplary array of spooling systems.
Figure 7B:
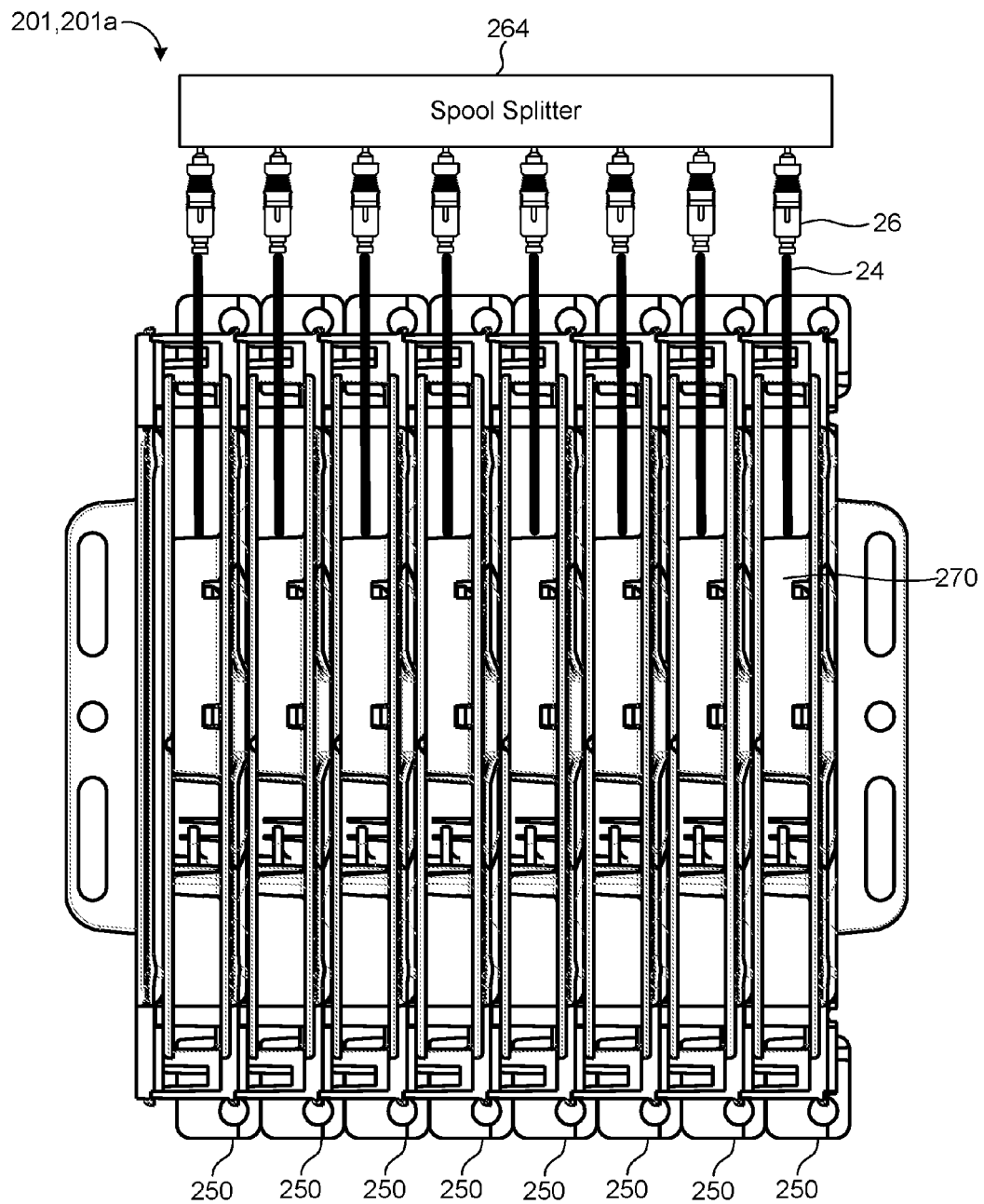
FIG. 7B is a front view of the exemplary array of spooling systems of FIG. 7A.
Figure 7C:
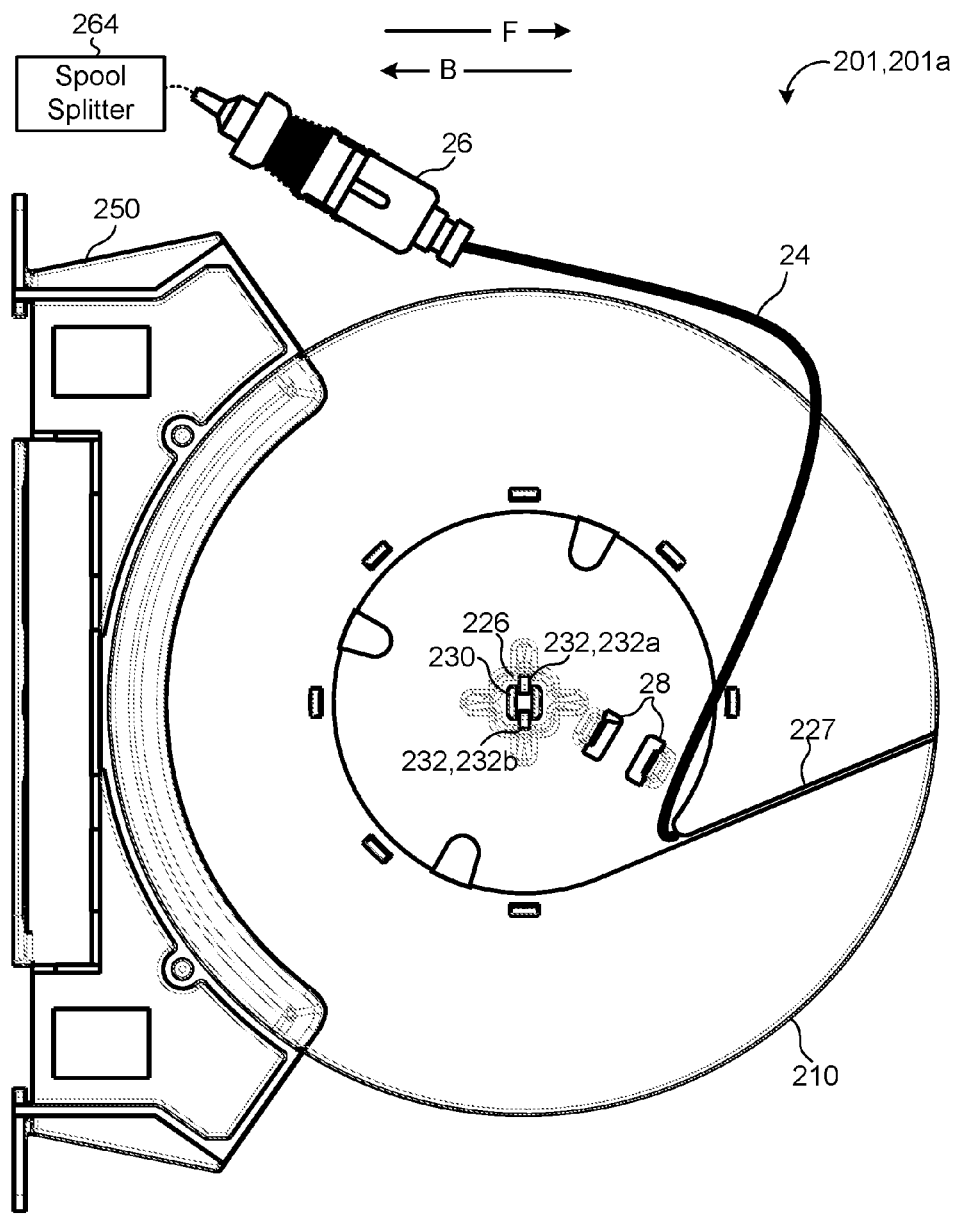
FIG. 7C is a side view of the exemplary array of spooling systems of FIG. 7A.
Figure 8A:
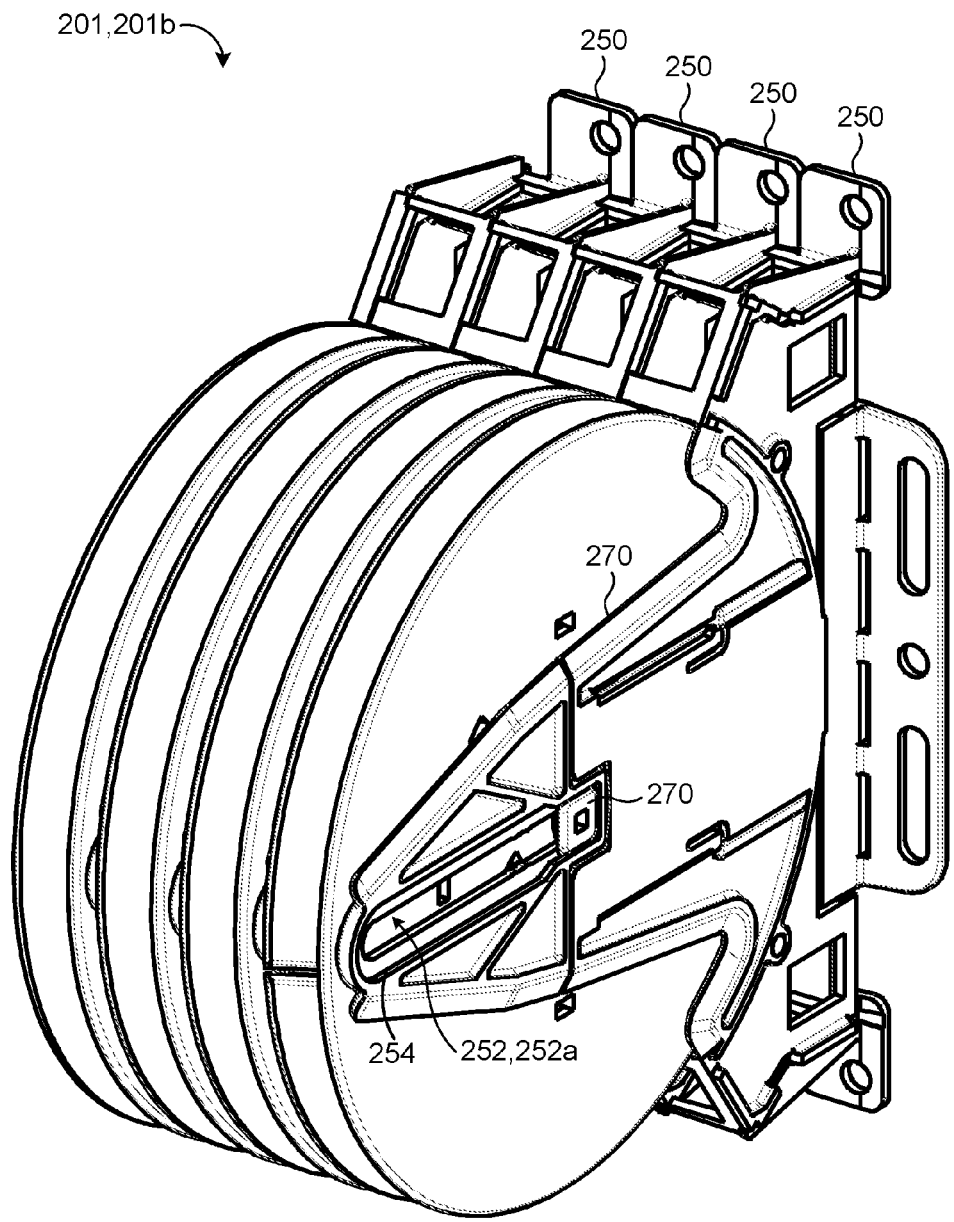
FIG. 8A is a perspective view of an exemplary array of spooling systems.

Referring to FIGS. 7A -8C, in some implementations, a spool array 201 includes multiple spool systems 200 arranged adjacent one another in a modular form. Each spool support 250, includes the base 260 and the cantilevered arm 270 disposed on the base 260, allow the compact arrangement of one spool system 200 adjacent to another spool system 200. In some examples, as shown in FIGS. 7A-7C, the spool array 201a includes eight spool systems 200. In other examples, as shown in FIGS. 8A-8C, the spool array 201b includes four spool systems 200. The spool array 201 may include any number of spool systems 200 arranged adjacent to one another.

Each spool system 200 includes a fiber drop cable 24 (e.g., 200 feet or more) long enough to reach a user's unit 120. The cable 24 includes two tips, a customer tip and an assembly tip. The customer tip is a pushable connector type spliced on each drop cable 24. The assembly tip (e.g., pre-connected SC/APC tip) is connected to a cassette or splitter housing 26, which is in turn connected to a spool splitter 264. Each spool system 200 allows the technicians to move the spool system 200 to a deployed position and then spool off the amount of drop fiber 24 that they need for each unit 120. When the technicians finish deploying the fiber cable 24, the technicians stow the spooling system 200 back to its stowed position, locking the cable fiber 24 and preventing it from being dropped. Since the spooling system 200 includes storage space for the fiber cable 24, the system 200 eliminates the need for additional slack (for storing an excess length of pre-connected fiber optic drop cable). Moreover, the containment of the extra fiber cable 24 in the spooling system 200 improves the aesthetics of the installation (e.g., by using 900 micron fiber cable, which is small and reinforced for up to 16 lbs of pull) and reduces the time the technician needs to deploy the fiber cable 24 by eliminating the time and cost to splice the fiber cable 24 for each user 30, leading to a reduction in the cost of the overall fiber deployment. In addition, the fiber cable 24 wound around the flanged cylinder 222 may be a 900 micron cable, which is smaller than the three millimeter cables that are generally used in the deployment of fiber cable 24 to the home of each user 30. The smaller cable (e.g., 900 micron) is lighter and fits in tighter spaces and within a compact spool body 210 (the spool body 210 has an outer diameter $D_{Out}$ equal to about four inches).

Referring back to FIGS. 4A, 7C, and 8B, in some implementation, the spool system 200 includes connector storage clips 28 for storing the splitter housing 26 of the assembly tip of the fiber 24 when it is not connected to the spool splitter 264. Therefore, when the splitter housing 26 is stored in the connector storage clip 28, the technician can detach the spool 210 from the spool support 250 by releasing the shaft support 226.

Figure 9:
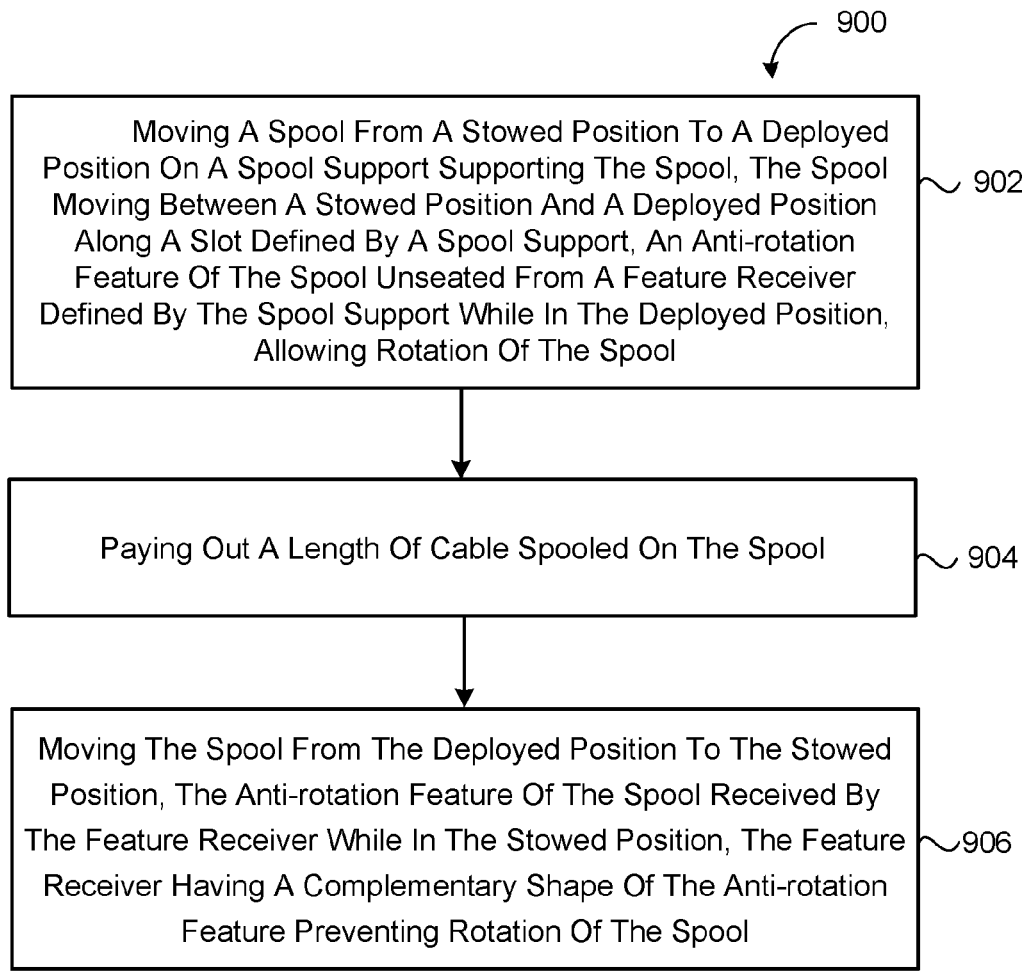
FIG. 9 is an exemplary arrangement of operations for a method of using a spooling system.

FIG. 9 provides an arrangement of operations for a method 900 of using a spool 210. The spool 210 includes a spool body 220 having a center axis of rotation R and a shaft 230 that has a first end 214a disposed on the spool body 220 and extending from the spool body 220 along the center axis of rotation R to a second end. Moreover, the spool 210 includes an anti-rotation feature 240 disposed on the shaft 230. The anti-rotation feature 240 defines a non-circular shape. The spool moves between a stowed position and a deployed position along a slot 252 defined by a spool support 250. The anti-rotation feature 240 of the spool is unseated from a feature receiver 254 defined by the spool support 250 while in the deployed position, allowing rotation of the spool 210. The method 900 includes moving 902 the spool 210 from the stowed position to the deployed position on the spool support 250 that supports the spool 210. The method 900 includes paying 904 out a length of cable 24 spooled on the spool 210; and moving 906 the spool 210 from the deployed position to the stowed position. The anti-rotation feature 240 of the spool is received by the feature receiver 254 while in the stowed position. The feature receiver 254 has a complementary shape of the anti-rotation feature 240 preventing rotation of the spool 210. In some examples, the method 900 includes moving the spool 210 onto a spool seat 262 defined by the spool support 250 when the spool 210 is in the stowed position. The method 900 may include connecting a connector 26 disposed on one end of the cable 24 to a spool splitter 264 disposed on the spool support 250.

In some implementations, the spool support 250 includes a spool seat 262 and a cantilevered arm 270 disposed on the spool seat 262. The cantilevered arm 270 defines the slot 252 and the feature receiver 254.

The anti-rotation feature 240 may be disposed on the second end 232b of the shaft 230 and may define a square shape. Additionally or alternatively, the slot 252 may have first and second ends 252a, 252b, where one end of the slot 252 defines the feature receiver 254.

The spool body 220 may include a flanged cylinder 222 defining a bore 224 and a shaft support 226 disposed in the bore 224 and receiving the shaft 230. A rotation of the shaft 230 causes rotation of the flanged cylinder 222. In some examples, the spool body 220 includes first and second ringed discs 228a, 228b spaced parallel from each other and a spool core 229 disposed between the ringed discs 228 and receiving the shaft 230. The rotation of the shaft 230 causes rotation of the spool core 229. One of the ringed discs 228 may define a slit 227 extending from an inner diameter of the ringed disc 228 to an outer diameter of the ringed disc 228.

Figure 10:
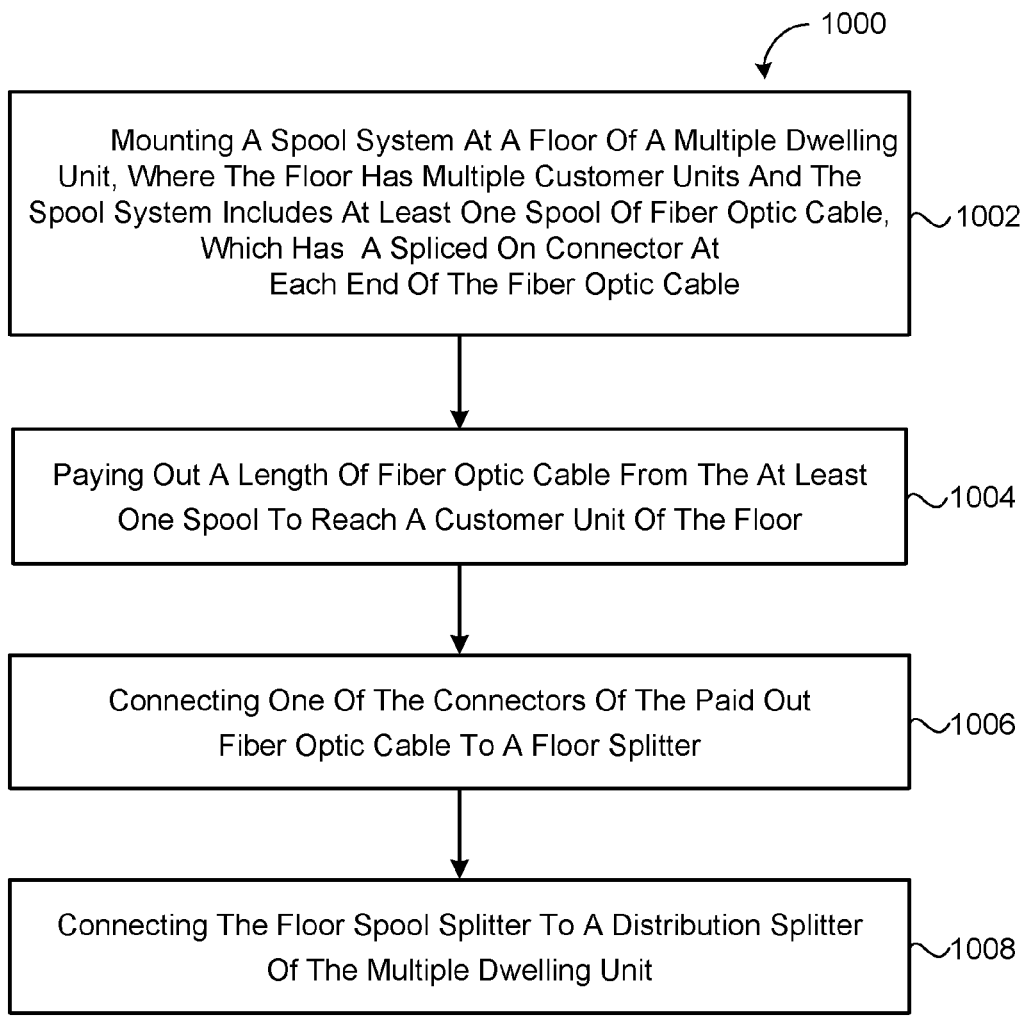
FIG. 10 is an exemplary arrangement of operations for a method of using a spooling system.

FIG. 10 provides an arrangement of operations for a method 1000 that includes mounting 1002 a spool system 200 on a floor 111 of a multiple dwelling unit 110. The spool system 200 includes at least one spool 210 of fiber optic cable 24. Each end of each fiber optic cable 24 has a spliced on connector 26. The method further includes paying out 1004 a length of fiber optic cable 24 from the at least one spool 210 to reach a customer unit 120 of the multiple dwelling unit 110, connecting 1006 one of the connectors 26 of the paid out fiber optic cable 24 to a floor splitter 264, and connecting 1008 the floor spool splitter 264 to a distribution splitter 113 of the multiple dwelling unit 110.

In some implementations, the distribution splitter 113 of the multiple dwelling unit is connected to other floor splitters 264 associated with other floors 110 of the multiple dwelling unit 110. The method may include moving the spool 210 from a stowed position to a deployed position on a spool support 250 supporting the spool 210 before paying out the length of fiber optic cable 24 spooled on the spool 210.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    mounting a spool system at a floor level of a multiple dwelling unit, the floor level having multiple customer units, the spool system comprising at least one spool of fiber optic cable, each end of each fiber optic cable having a spliced-on connector;
    moving the at least one spool from a stowed position to a deployed position on a spool support supporting the at least one spool, the at least one spool comprising:
        a spool body having a center axis of rotation;
        a shaft having a first end disposed on the spool body and extending from the spool body along the center axis of rotation to a second end; and
        an anti-rotation feature disposed on the shaft, the anti-rotation feature defining a non-circular shape,
        wherein the spool moves in a direction extending perpendicular to the center axis of rotation between the stowed position and the deployed position along a slot defined by a spool support, and the anti-rotation feature of the spool unseated from a feature receiver defined by the spool support while in the deployed position, allowing rotation of the spool;
    paying out a length of fiber optic cable from the at least one spool to reach a customer unit of the floor level;
    moving the at least one spool from the deployed position to the stowed position after paying out the length of fiber optic cable, the anti-rotation feature of the at least one spool received by the feature receiver while in the stowed position, the feature receiver having a complementary shape of the anti-rotation feature preventing rotation of the at least one spool;
    connecting one of the connectors of the paid-out fiber optic cable to a floor splitter; and
    connecting the floor splitter to a distribution splitter of the multiple dwelling unit.

2. The method of claim 1, wherein the distribution splitter of the multiple dwelling unit is connected to other floor splitters associated with other floors of the multiple dwelling unit.

3. The method of claim 1, further comprising moving the at least one spool onto a corresponding spool seat defined by the spool support when the at least one spool is the stowed position.

4. The method of claim 1, wherein the anti-rotation feature is disposed on the second end of the shaft.

5. The method of claim 1, wherein the anti-rotation feature defines a square shape.

6. The method of claim 1, wherein the slot has first and second ends, one end of the slot defining the feature receiver.

7. The method of claim 1, wherein the spool support comprises:
    a base; and a
    a cantilevered arm disposed on the base, the cantilevered arm defining the slot and the feature receiver.

8. The method of claim 7, wherein the base defines a spool seat, the at least one spool seated in the spool seat while in the stowed position.

9. The method of claim 7, wherein the spool splitter is disposed on the base of the spool support.

10. The method of claim 1, wherein the spool body comprises:
    a flanged cylinder defining a bore; and
    a shaft support disposed in the bore and receiving the shaft,
    wherein rotation of the shaft causes rotation of the flanged cylinder.

11. The method of claim 1, wherein the spool body comprises:
    first and second ringed discs spaced parallel from each other; and
    a spool core disposed between the ringed discs and receiving the shaft,
    wherein rotation of the shaft causes rotation of the spool core.

12. The method of claim 11, wherein one of the ringed discs defines a slit extending from an inner diameter of the ringed disc to an outer diameter of the ringed disc.

13. The method of claim 1, wherein the slot has a first side and a second side opposite the first the side, the slot comprising:
    a first feature guide disposed on the first side of the slot and configured to guide the anti-rotation feature towards the feature receiver; and
    a second feature guide disposed on the second side of the slot and configured to guide the anti-rotation feature towards the feature receiver, the first feature guide offset from the second feature guide by a distance extending parallel to the slot.

* * * * *